H. OGBORN.
Hog-Trap.
No. 163,603.
Patented May 25, 1875.
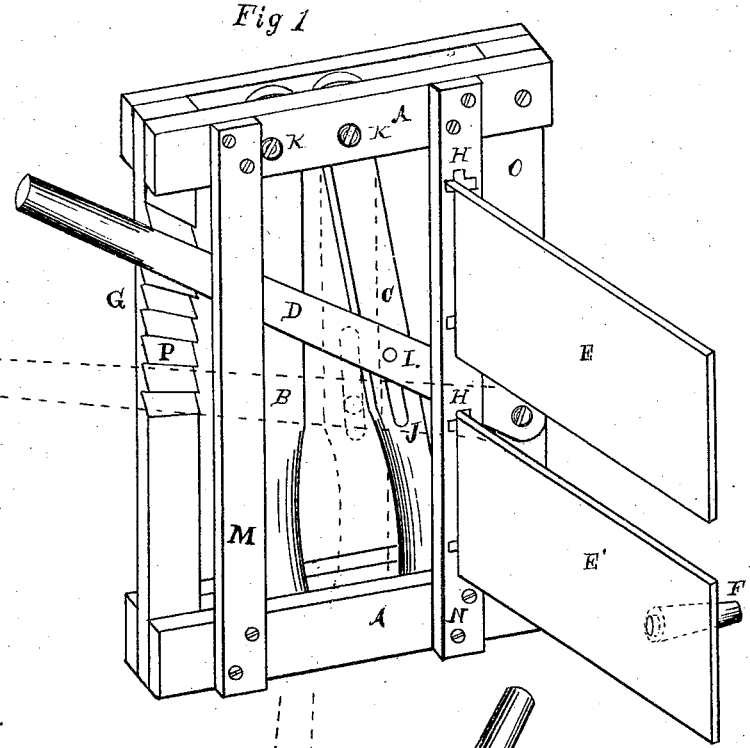
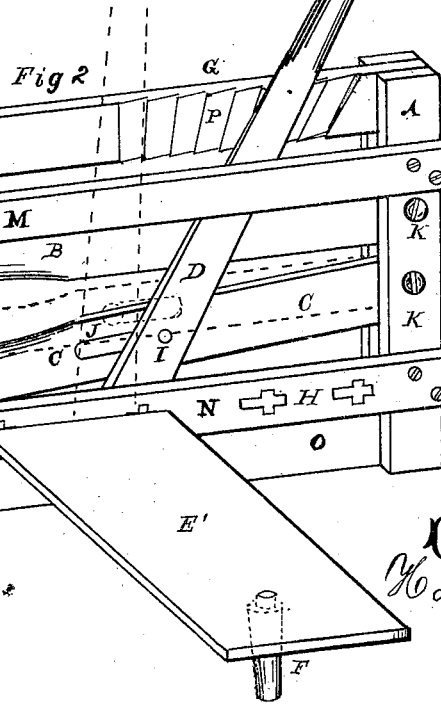
Attest
E. B. Hindman
Caleb Elliott
Inventor
Harrison Ogborn

UNITED STATES PATENT OFFICE.

HARRISON OGBORN, OF RICHMOND, INDIANA, ASSIGNOR TO SAMUEL WATSON, OF SAME PLACE.

IMPROVEMENT IN HOG-TRAPS.

Specification forming part of Letters Patent No. 163,603, dated May 25, 1875; application filed March 9, 1875.

*To all whom it may concern:*

Be it known that I, HARRISON OGBORN, of the city of Richmond, Wayne county, and State of Indiana, have invented a new and useful Improvement in Hog-Traps, to catch and hold hogs while they are being ringed, castrated, marked, or spayed; and I hereby declare the following to be a full, clear, and exact description of the same, reference being had to the accompanying drawings, making part of this specification, in which—

Figure 1 is a perspective view of my device when open. Fig. 2 is a perspective view of the same when turned down on its edge. Fig. 3 is a view of a detached portion thereof. Fig. 4 is a view of a detached portion of the same.

The object of my invention is to produce a device by which I can secure and hold hogs and other animals, without injuring and without being injured by them, while being ringed, castrated, marked, or spayed; and to these ends it consists of the combination of parts hereinafter described.

In order that those skilled in the art may make and use my invention, I will proceed to describe the manner in which I have carried it out.

In my drawings, A A is a stout wooden frame, having the pieces fastened firmly together by bolts or otherwise. The spaces between the two parts composing the upper horizontal cross-pieces of the frame and the two lower horizontal cross-pieces of the same act as guides for the jaws B C, while a lever, D, is placed between the uprights G M N O, the broad end of which is pivoted by a bolt onto the upright piece O. A pin, I, is firmly attached to the lever D, which projects into and works loosely in the slot J in the lever C, which lever is slightly sharpened on its upper edge near the handle, so as to catch in the ratchet P in the upright G, to hold the swinging bar C in any position desired. The jaw C is pivoted at its upper end by a bolt or otherwise. Where the jaws C B come in contact with the animal's neck, they are cut away, as shown in the drawings, so as to conform to the shape of the animal's neck. The edges are rounded, and may be padded, so as not to injure the animal when caught in the trap. The board M not only acts as a guide for the lever D, but is necessary to close up the space between the piece G and bar B. The board N helps to fill up the space between the swinging bar C and upright piece O. In this board are four cross-shaped mortises, through which the tenons R and pins L pass, as shown in the different figures. Board E' is a broad board, standing as shown in Fig. 1. It is detachably held in place by tenons and pins, as shown in Fig. 4, which pass through the mortise H and drop down slightly, thus causing the pin L to hold the tenon in the mortise, and prevent the board falling out. Board E is held in position in the same manner. These boards form one side of the chute for the hogs, and when the machine is turned over on its side the leg F rests on the ground, supporting one end of the board E' in such a position as to form a table for spaying hogs on, as shown in Fig. 2. The jaws B C are made so as to open wide enough to allow the largest-sized hog to pass through, and come close enough together to catch and hold any sized hog. It is evident that when the lever D is thrown up, the bar C will be thrown away from bar B by the pin I slipping in the slot J in the bar C far enough to allow the animal to pass through between the jaws B C, and that bringing the lever down to a horizontal position will cause the pin I to slip downward in the slot J, thus forcing the bar C toward the standing bar B, the lever D engaging in the ratchet P, thus bringing the jaws together.

The operation is as follows: The machine being set in a door or gateway, the animal to be caught is driven into the trap, and as it attempts to pass between the jaws B C, the lever D is suddenly depressed by the operator when the animal has its head through the trap. This causes the jaws to be firmly pressed on each side of the animal's neck, and thus firmly hold it to be operated upon in any way that may be desirable, such as ringing, castrating, marking, &c., when the lever being thrown up releases the animal, and it passes through the trap. But when it is desired to perform the operation of spaying, then, the trap being operated as before, and the animal secured, the trap is turned over on its side, as shown in Fig. 2. The animal will be lying on its right side, where it may be fastened in any convenient manner, and the board E being removed, it will be in position to have the operation performed successfully.

By my device I am enabled to catch and hold animals securely and safely, many of which are vicious and dangerous when caught in the hands, besides preventing the damage which often occurs when hogs are caught by the legs and thrown down. The trap may be large enough to catch larger animals on the same plan.

Having thus described my invention, what I claim therein as new and useful, and desire to secure by Letters Patent, is—

1. The jaws B C, in combination with the lever D, slot J, pin I, and ratchet P, constructed and operating substantially as and for the purposes set forth.

2. The detachable table E', secured to the upright N by the tenons R and mortises H, in combination with the jaws B C and frame A, substantially as and for the purposes set forth.

HARRISON OGBORN.

Witnesses:
F. B. HUNT,
N. A. HUNT.